US012283772B2

(12) United States Patent
Nakamura

(10) Patent No.: US 12,283,772 B2
(45) Date of Patent: Apr. 22, 2025

(54) CONNECTOR

(71) Applicant: SUMITOMO WIRING SYSTEMS, LTD., Mie (JP)

(72) Inventor: Yuji Nakamura, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 323 days.

(21) Appl. No.: 17/909,425

(22) PCT Filed: Feb. 17, 2021

(86) PCT No.: PCT/JP2021/005787
§ 371 (c)(1),
(2) Date: Sep. 5, 2022

(87) PCT Pub. No.: WO2021/182035
PCT Pub. Date: Sep. 16, 2021

(65) Prior Publication Data

US 2023/0125720 A1 Apr. 27, 2023

(30) Foreign Application Priority Data

Mar. 10, 2020 (JP) ................................ 2020-040596

(51) Int. Cl.
*H01R 13/627* (2006.01)
*H01R 13/631* (2006.01)

(52) U.S. Cl.
CPC ....... *H01R 13/6273* (2013.01); *H01R 13/631* (2013.01)

(58) Field of Classification Search
CPC ......................... H01R 13/641; H01R 13/6272; H01R 13/631; H01R 13/6273
See application file for complete search history.

(56) References Cited

U.S. PATENT DOCUMENTS

2002/0160651 A1 10/2002 Endo et al.
2013/0210266 A1 8/2013 Osada et al.
(Continued)

FOREIGN PATENT DOCUMENTS

JP H03-019273 A 1/1991
JP H07-006818 A 1/1995
(Continued)

OTHER PUBLICATIONS

International Search Report issued on May 11, 2021 for WO 2021/182035 A1 (4 pages).

*Primary Examiner* — Jean F Duverne
(74) *Attorney, Agent, or Firm* — Venjuris, P.C.

(57) ABSTRACT

The detecting member includes deflectable and deformable resilient portions and the second housing includes an interfering portion for interfering with the resilient portions. The resilient portions have a deflected state attained by interfering with the interfering portion to be deflected and deformed, a returned state attained by being displaced in a return direction from the deflected state and a transition state for transitioning from the deflected state to the returned state. The interfering portion is provided with detection guiding portions. The detection guiding portions guide the detecting member to the detection position by sliding in contact with the resilient portions by a resilient restoring force of the resilient portions in the transition state of the resilient portions.

7 Claims, 12 Drawing Sheets

(56) References Cited

U.S. PATENT DOCUMENTS

| | | | | |
|---|---|---|---|---|
| 2020/0044388 | A1 | 2/2020 | Kanda et al. | |
| 2020/0076132 | A1* | 3/2020 | Yang | H01R 12/73 |
| 2023/0125720 | A1* | 4/2023 | Nakamura | H01R 13/6273 439/350 |

FOREIGN PATENT DOCUMENTS

| | | | | |
|---|---|---|---|---|
| JP | H07-050180 | A | 2/1995 | |
| JP | H09-147982 | A | 6/1997 | |
| WO | 2011/069610 | A1 | 6/2011 | |
| WO | WO-2021182035 | A1 * | 9/2021 | H01R 13/6273 |

* cited by examiner

CONNECTOR

CROSS REFERENCE TO RELATED APPLICATIONS

This application is a national phase of PCT application No. PCT/JP2021/005787, filed on 17 Feb. 2021, which claims priority from Japanese patent application No. 2020-040596, filed on 10 Mar. 2020, all of which are incorporated herein by reference.

TECHNICAL FIELD

The present disclosure relates to a connector.

BACKGROUND

A connector disclosed in Patent Document 1 is provided with a pair of connector housings connectable to each other and a connection detecting member. One of the pair of connector housings is provided with a lock arm. The other connector housing includes an engaging portion to be engaged with a lock portion of the lock arm and is coupled to the one connector housing by the engagement of the lock portion and the engaging portion when being connected to the one connector housing. The connection detecting member is mounted in the one connector housing slidably along a connecting direction, and an intermediate connected state during the connection of the connector housings is detected based on whether or the not the slider is slidable. This connector can complete a housing connecting operation and a moving operation of the connection detecting member at once in one operation of connecting the connector housings to each other in a connection process of the pair of connector housings. Such a technique is also disclosed in Patent Document 2 to 5.

PRIOR ART DOCUMENT

Patent Document

Patent Document 1: JP 2002-373735 A
Patent Document 2: JP H03-019273 A
Patent Document 3: JP H07-006818 A
Patent Document 4: JP H07-050180 A
Patent Document 5: JP H09-147982 A

SUMMARY OF THE INVENTION

Problems to be Solved

In the case of Patent Document 1, since the connection of the housings and a movement of the connection detecting member can be completed by one operation, the number of operations at the time of connecting the connector housings to each other can be reduced. However, since the connection detecting member is directly pushed in the connection process, a pushing operation has been necessary in two steps for the connecting operation of the housings and the moving operation of the connection detecting member.

Accordingly, the present disclosure aims to provide a connector capable of simplifying operations.

Means to Solve the Problem

The present disclosure is directed to a connector with a first housing and a second housing connectable to each other, and a detecting member arranged movably to a standby position and a detection position with respect to the first housing, the detecting member being allowed to move to the detection position when the first and second housings are properly connected, wherein either one of the second housing and the detecting member includes a deflectable and deformable resilient portion and the other includes an interfering portion for interfering with the resilient portion, the resilient portion has a deflected state attained by interfering with the interfering portion to be deflected and deformed, a returned state attained by being displaced in a return direction from the deflected state and a transition state for transitioning from the deflected state to the returned state, and either one of the resilient portion and the interfering portion includes a detection guiding portion for guiding the detecting member to the detection position by sliding in contact with the other by a resilient restoring force of the resilient portion in the transition state of the resilient portion.

Effect of the Invention

According to the present disclosure, it is possible to provide a connector capable of simplifying operations.

DETAILED DESCRIPTION TO EXECUTE THE INVENTION

Description of Embodiments of Present Disclosure

Figure 1:
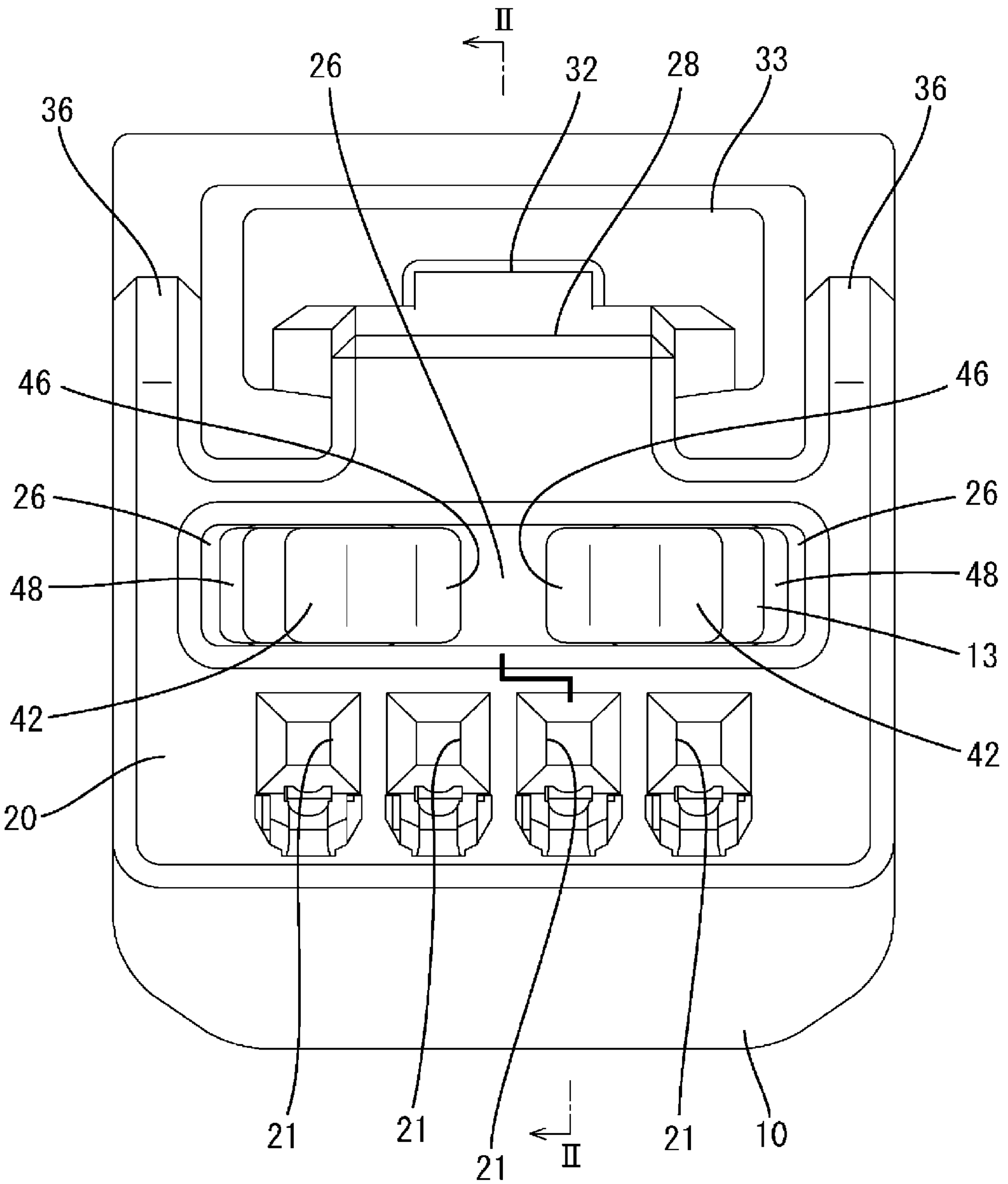
FIG. 1 is a front view of a female connector according to an embodiment.

First, embodiments of the present disclosure are listed and described.

(1) The connector of the present disclosure is provided with a first housing and a second housing connectable to each other, and a detecting member arranged movably to a standby position and a detection position with respect to the first housing, the detecting member being allowed to move to the detection position when the first and second housings are properly connected, wherein either one of the second housing and the detecting member includes a deflectable and deformable resilient portion and the other includes an interfering portion for interfering with the resilient portion, the resilient portion has a deflected state attained by interfering with the interfering portion to be deflected and deformed, a returned state attained by being displaced in a return direction from the deflected state and a transition state for transitioning from the deflected state to the returned state, and either one of the resilient portion and the interfering portion includes a detection guiding portion for guiding the detecting member to the detection position by sliding in contact with the other by a resilient restoring force of the resilient portion in the transition state of the resilient portion. According to this configuration, if the first and second housings are properly connected, the detecting member is guided to the detection position by the detection guiding portion. The detection guiding portion automatically moves the detecting member to the detection position without the detecting member being touched by a worker's hand, using a resilient restoring force of the resilient portion. Thus, an operation of pushing the detecting member to the detection position after connector connection becomes unnecessary and operations can be simplified.

(2) Preferably, the first housing accommodates the detecting member. According to this configuration, it is possible to avoid the enlargement of the connector due to the detecting member as in the case of providing the detecting member outside the housing.

(3) The resilient portion may be made of resin and integrally formed to the detecting member or the second housing. According to this configuration, the resilient portion integrated with the detecting member or the second housing can be easily formed. Further, the number of components can be reduced as compared to the case where the resilient portion is formed separately from the detecting member or the second housing.

(4) A pair of the resilient portions may be provided and arranged to face each other in a direction orthogonal to a moving direction of the detecting member, and a pair of the detection guiding portions may be provided at positions corresponding to the pair of resilient portions. According to this configuration, a larger resilient restoring force can be easily generated as compared to the case where one resilient portion is provided. Further, by arranging the pair of resilient portions to face each other, the resilient restoring force can act in a well-balanced manner.

(5) The detection guiding portion may be provided on the interfering portion, and the interfering portion may be provided with a deflection guiding portion for guiding the resilient portion to the deflected state by contacting the resilient portion earlier than the detection guiding portion. According to this configuration, the resilient portion can be easily guided to the deflected state by the deflection guiding portion.

(6) The resilient portion may be provided on the detecting member, the resilient portion may include a locking portion lockable to a locked portion provided in the first housing when the detecting member is at the standby position, and locking of the locking portion to the locked portion may be released when the resilient portion is in the deflected state. According to this configuration, a state where the detecting member is at the standby position is suitably maintained by locking the locking portion to the locked portion. Further, since the locking of the locking portion and the locked portion is released when the resilient portion is in the deflected state, the locking can be automatically released in a connection process. As a result, an operation of releasing the locking of the locking portion and the locked portion becomes unnecessary and the complication of operations can be avoided.

(7) The first housing may include a resiliently displaceable lock arm for holding the second housing in a connected state, and the lock arm may include a restricting portion for restricting a movement of the detecting member to the detection position by contacting the detecting member in a resiliently displaced state. According to this configuration, the detecting member can be prevented from inadvertently moving from the standby position to the detection position in a state where the connector is not properly connected.

Details of Embodiment of Present Disclosure

A specific example of a connector of the present disclosure is described below with reference to the drawings. Note that the present invention is not limited to these illustrations and is intended to be represented by claims and include all changes in the scope of claims and in the meaning and scope of equivalents.

Figure 2:
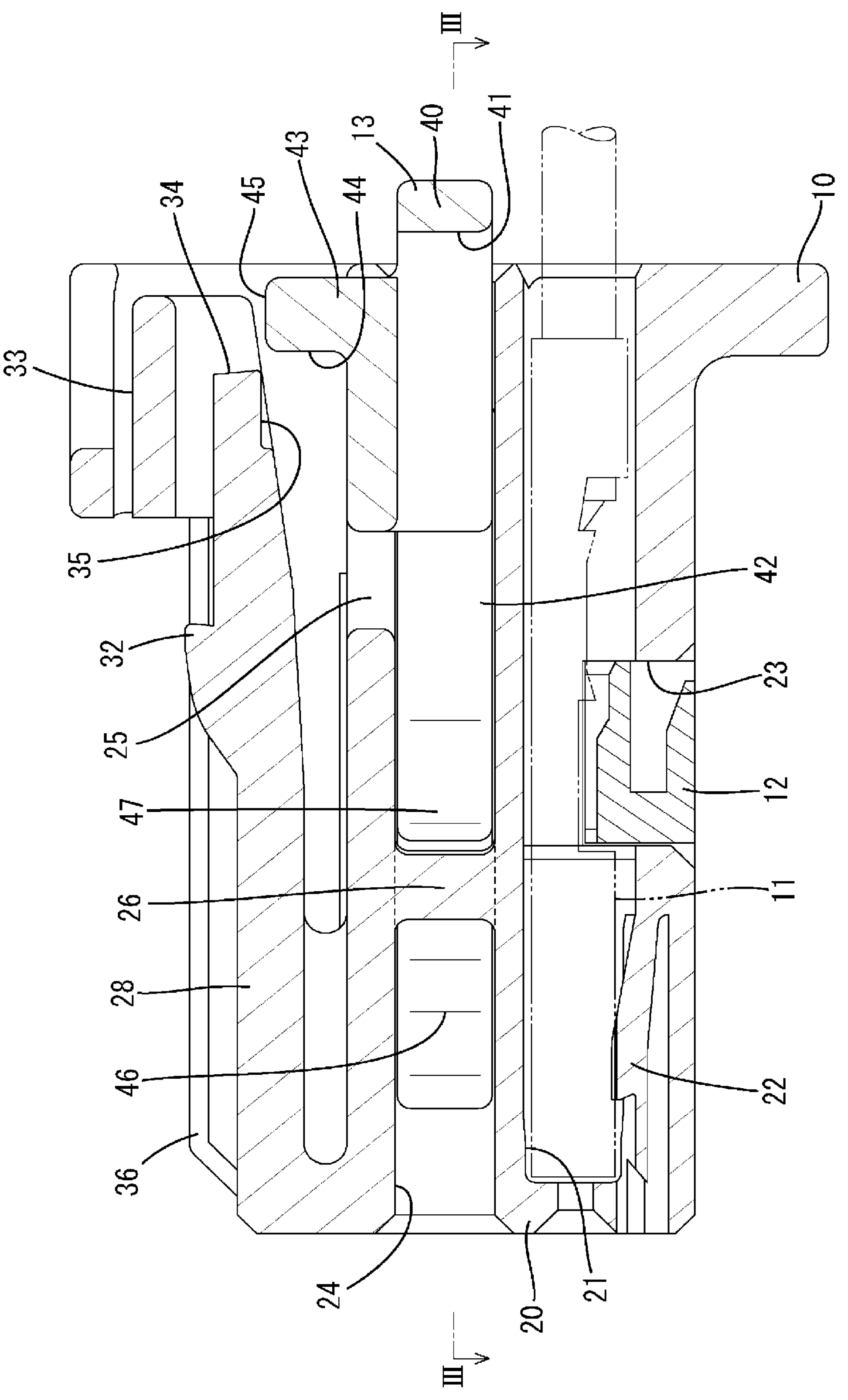
FIG. 2 is a section along II-II of FIG. 1.
Figure 3:
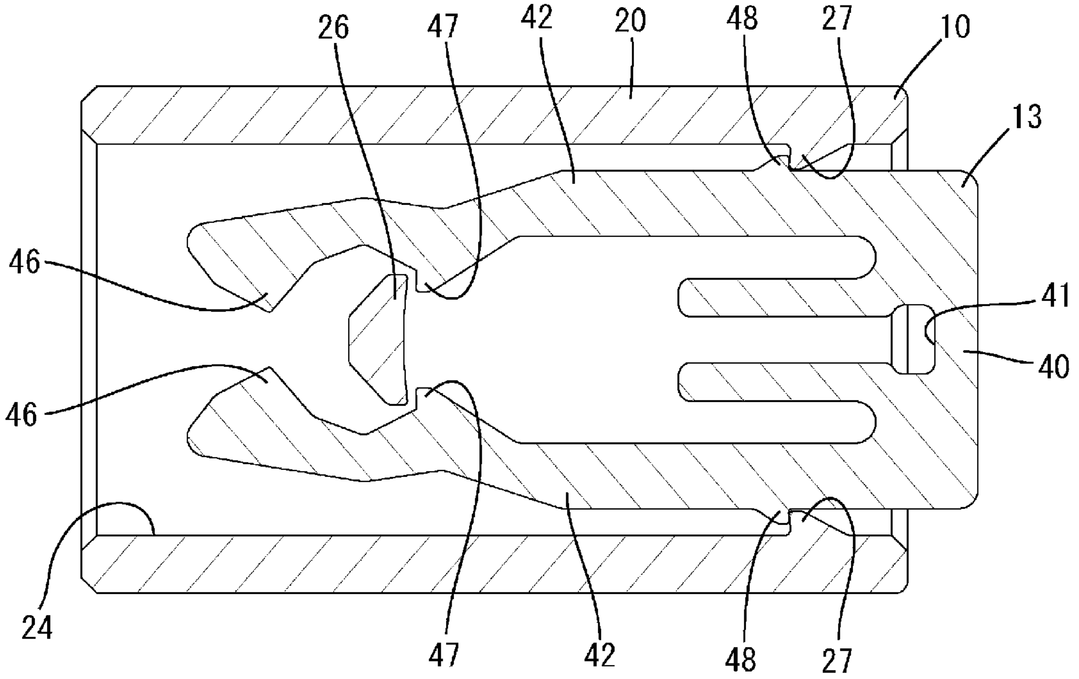
FIG. 3 is a section along III-III of FIG. 2.
Figure 5:
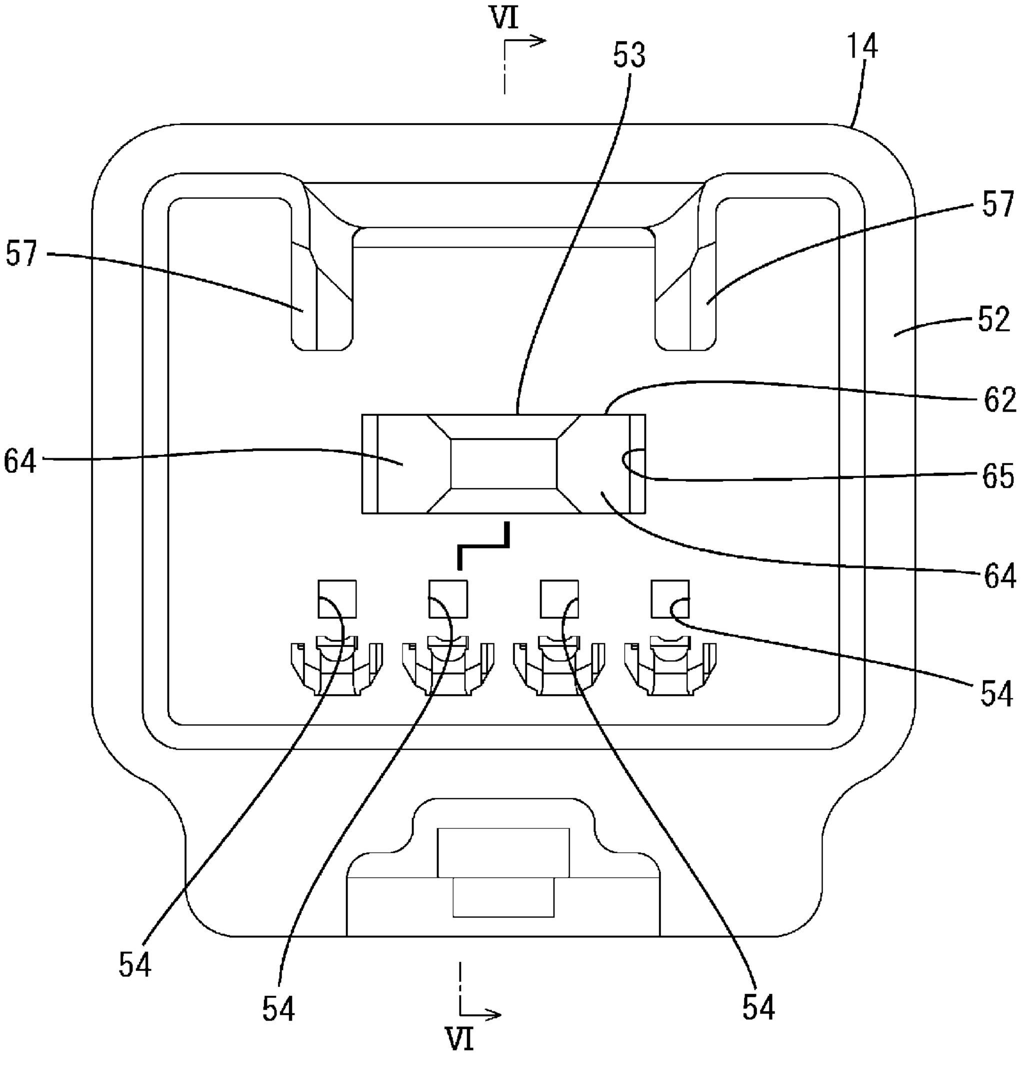
FIG. 5 is a front view of a second housing according to the embodiment.
Figure 6:
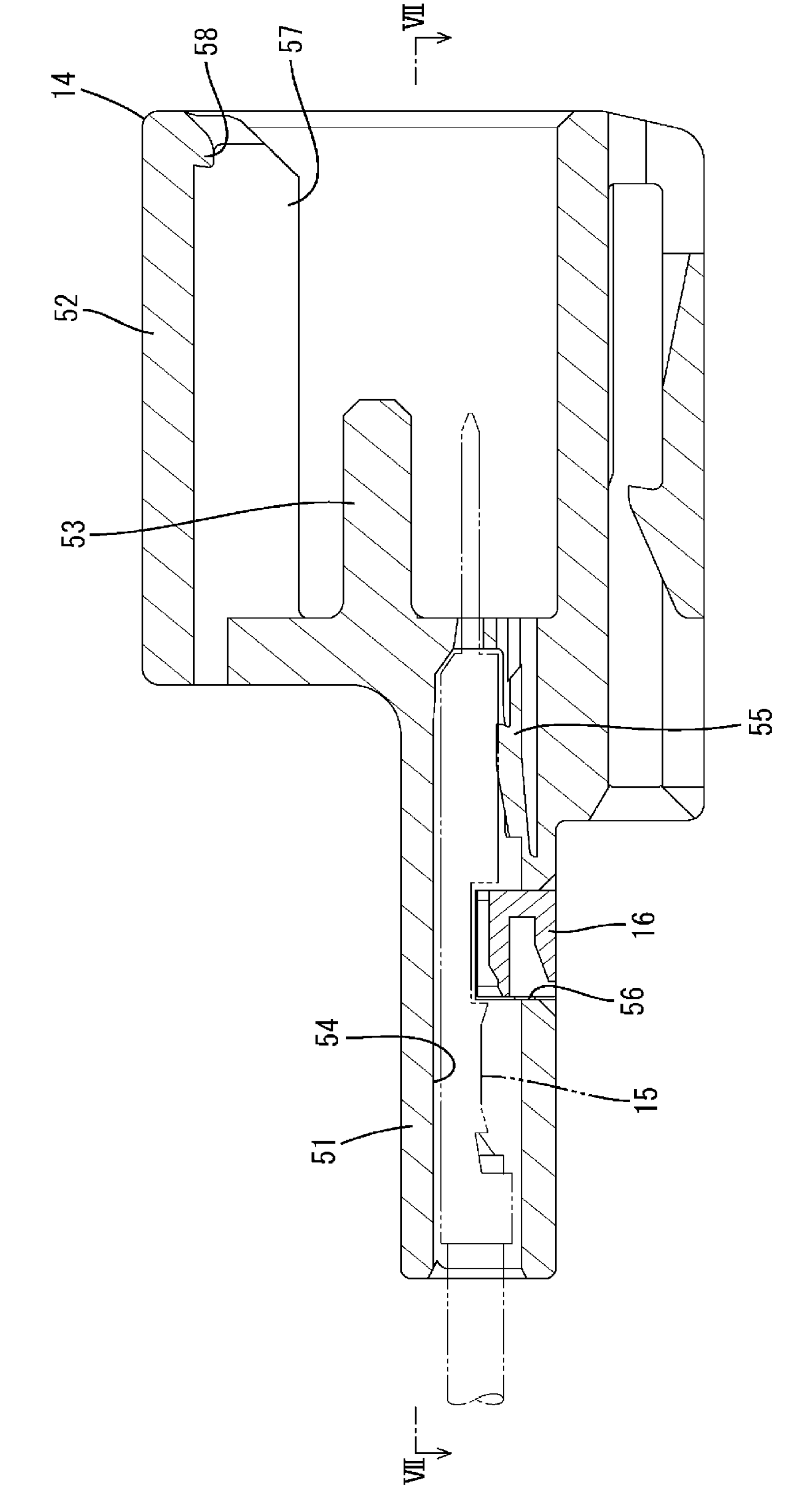
FIG. 6 is a section along VI-VI of FIG. 5 in a male connector according to the embodiment.
Figure 7:
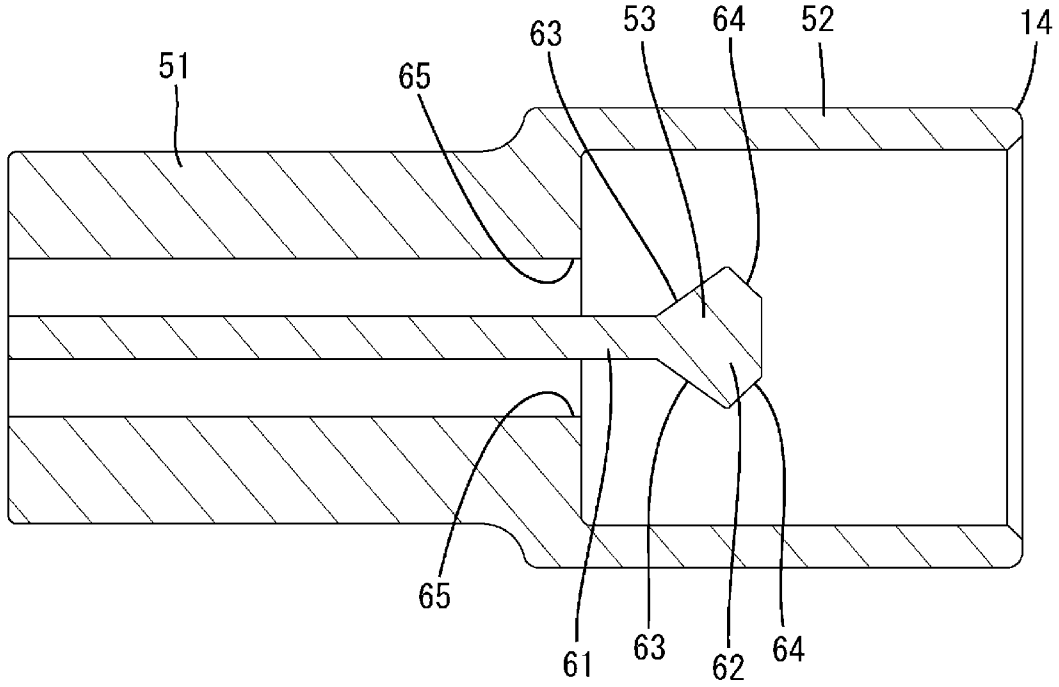
FIG. 7 is a section along VII-VII of FIG. 6.

The connector is composed of a male connector and a female connector connectable to each other. The female connector includes a first housing 10, first terminal fittings 11, a first retainer 12 and a detecting member 13 as shown in FIGS. 1 to 3. The male connector includes a second housing 14, second terminal fittings 15 and a second retainer 16 as shown in FIGS. 5 to 7. The first and second housings 10, 14 are connectable to each other. Note that, in the following description, surface sides facing each other when the connection of the both housings 10, 14 is started are respectively referred to as front sides concerning a front-rear direction. A vertical direction is based on a vertical direction of each of FIGS. 1, 2, 5, 6, 9, 11 and 13. A width direction is equivalent to a lateral direction in FIGS. 1, 5 and the like. Directions specified in this specification may not necessarily coincide with actual directions.

<First Housing 10>

The first housing 10 is made of synthetic resin and includes, as shown in FIG. 1, a housing body 20 in the form of a rectangular block. The housing body 20 includes a plurality of (four in FIG. 1) first cavities 21. The respective first cavities 21 are arranged in a row in the width direction in the housing body 20. As shown in FIG. 2, the housing body 20 includes deflectable first locking lances 22 on the lower surfaces of the respective first cavities 21. The first terminal fitting 11 is inserted into the first cavity 21 from behind and retained and locked by the first locking lance 22. The housing body 20 includes a first mounting hole 23 communicating with the respective first cavities 21 and open in a lower surface. The first retainer 12 is inserted into the first mounting hole 23 from below.

As shown in FIGS. 1 to 3, the housing body 20 has an open accommodation space 24 penetrating in the front-rear direction. The detecting member 13 is accommodated into the accommodation space 24. The accommodation space 24 has a rectangular cross-sectional shape having a longitudinal direction oriented in the width direction, and is formed above the plurality of first cavities 21. A through portion 25 penetrating in the vertical direction is formed in the rear end upper wall of the accommodation space 24. The through portion 25 is formed by cutting the housing body 20 forward from the rear surface of the housing body 20 and has a recess-like shape in a plan view. A later-described projecting portion 43 of the detecting member 13 is passed through the through portion 25 from below.

As shown in FIG. 3, a locked portion 26 and locked projections 27 are provided in the accommodation space 24. The locked portion 26 is provided at a position in a laterally central part of the accommodation space 24 and near a front end. The locked portion 26 extends in the vertical direction while having a halfmoon cross-sectional shape convex forward. Both upper and lower ends of the locked portion 26 are respectively connected to upper and lower wall surfaces of the accommodation space 24. Later-described locking portions 47 of the detecting member 13 are locked to the locked portion 26. As shown in FIG. 3, the rear surface of the locked portion 26 is inclined rearward toward widthwise outer sides. A pair of the locked projections 27 are provided at positions near a rear end on left and right side walls of the accommodation space 24. The pair of locked projections 27 are in the form of claws projecting toward a widthwise central side from the left and right wall surfaces of the accommodation space 24. Later-described locking projections 48 of the detecting member 13 are locked to the locking projections 27.

As shown in FIGS. 1 and 2, the first housing 10 includes a lock arm 28. The lock arm 28 projects upward from the front end of the upper surface of the housing body 20 and is cantilevered rearward from the upper end of that front end. The lock arm 28 is resiliently displaceable downward with a connected part of a front end part thereof to the housing body 20 as a fulcrum. A pair of protection walls 36 are provided to rise on both left and right sides of the upper surface of the housing body 20. The lock arm 28 is arranged in a state laterally protected by the both protection walls 36.

As shown in FIG. 2, the lock arm 28 includes a lock projection 32, an unlocking portion 33, a restricting portion 34 and a receiving surface portion 35. The lock projection 32 is in the form of a claw projecting in an intermediate part in the front-rear direction of the upper surface of the lock arm 28. The lock projection 32 is engaged with a lock portion 58 of the second housing 14 when the first and second housings 10, 14 are properly connected. The unlocking portion 33 is formed high in a stepped manner in a rear end part of the lock arm 28. The unlocking portion 33 is pressed in separating the both housings 10, 14 in the properly connected state.

When the connection of the both housings 10, 14 is started, the lock projection 32 interferes with the lock portion 58 and the lock arm 28 is resiliently displaced downward with a front end side as a fulcrum. The lock arm 28 holds the both housings 10, 14 in the connected state by the lock projection 32 being locked to the lock portion 58 of the second housing 14 (see FIGS. 11 and 13).

The restricting portion 34 restricts a movement of the detecting member 13 to a detection position. The restricting portion 34 is facing rearward in the rear end part of the lock arm 28. The restricting portion 34 is provided to be capable of contacting a later-described restricted portion 44 of the detecting member 13 with the lock arm 28 resiliently deformed. The receiving surface portion 35 is facing downward in the rear end part of the lock arm 28. The receiving surface portion 35 is provided to be capable of contacting a later-described receiving portion 45 of the detecting member 13 in a state where the lock arm 28 is in a natural state and the detecting member 13 is at the detection position, and blocks unlocking by restricting a downward resilient displacement of the lock arm 28 by contacting the receiving portion 45.

<First Terminal Fittings 11, First Retainer 12>

As shown in FIG. 2, the first terminal fitting 11 is made of electrically conductive metal and elongated in the front-rear direction. The first terminal fitting 11 is arranged in the first cavity 21 of the housing body 20. The first terminal fitting 11 is primarily locked in the first cavity 21 by the first locking lance 22. The first terminal fitting 11 is connected to the second terminal fitting 15 of the male connector when the connectors are properly connected. The first retainer 12 is made of synthetic resin and shaped to be long in the width direction. The first retainer 12 is inserted into the first mounting hole 23 of the housing body 20 to secondarily restrict the first terminal fittings 11 from coming out rearward from the first cavities 21.

<Detecting Member 13>

Figure 12:
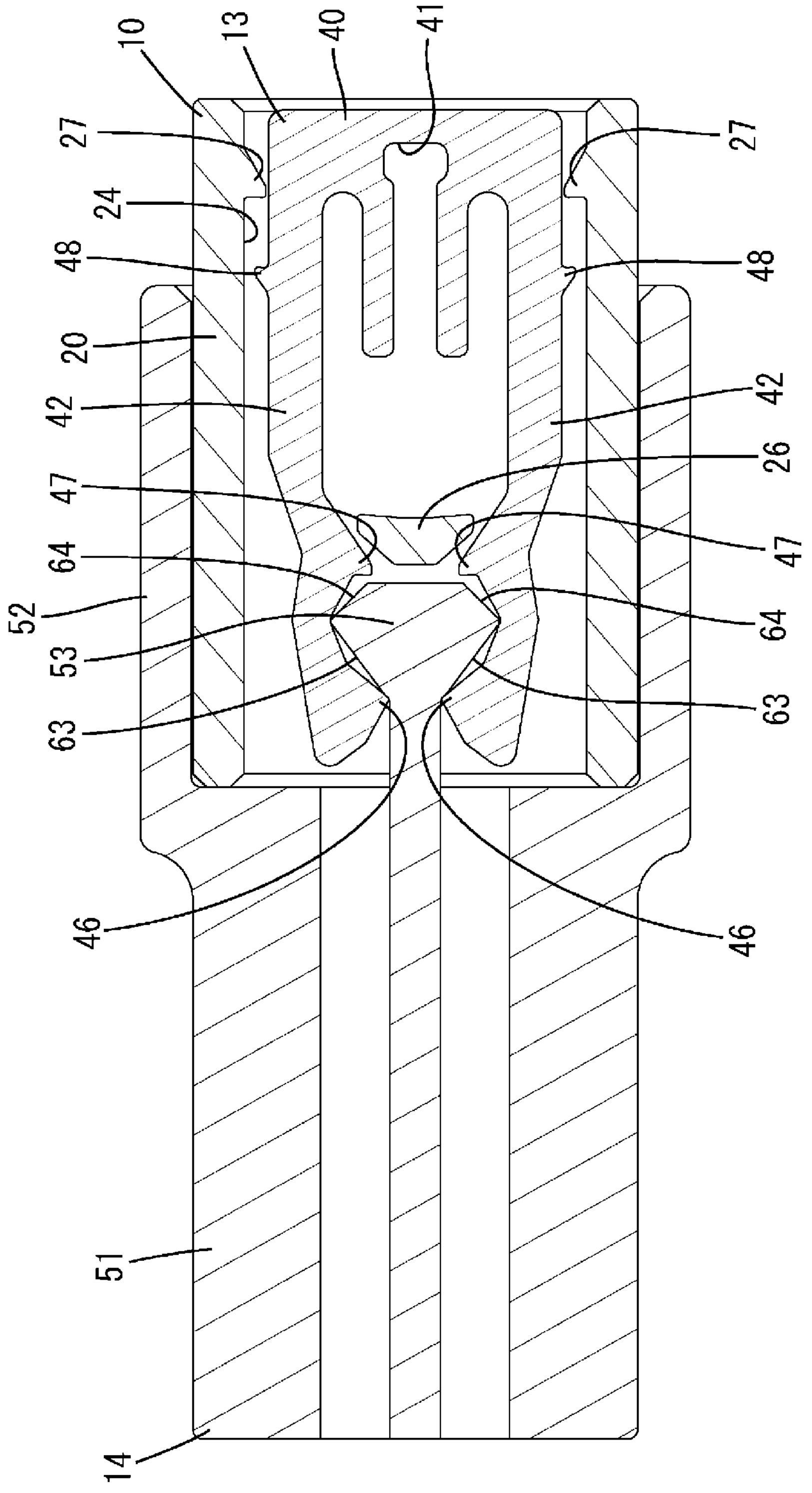
FIG. 12 is a plan view in section showing the connector in a properly connected state.

As shown in FIGS. 1 to 3, the detecting member 13 is accommodated in the accommodation space 24 of the first housing 10. The detecting member 13 is dimensioned to be entirely accommodated in the accommodation space 24. The detecting member 13 is arranged movably to a standby position (see FIGS. 2 and 3) and the detection position (FIGS. 12 and 13) with respect to the first housing 10. The detecting member 13 moves from the standby position to the detection position when the first and second housings 10, 14 are properly connected.

Figure 4:
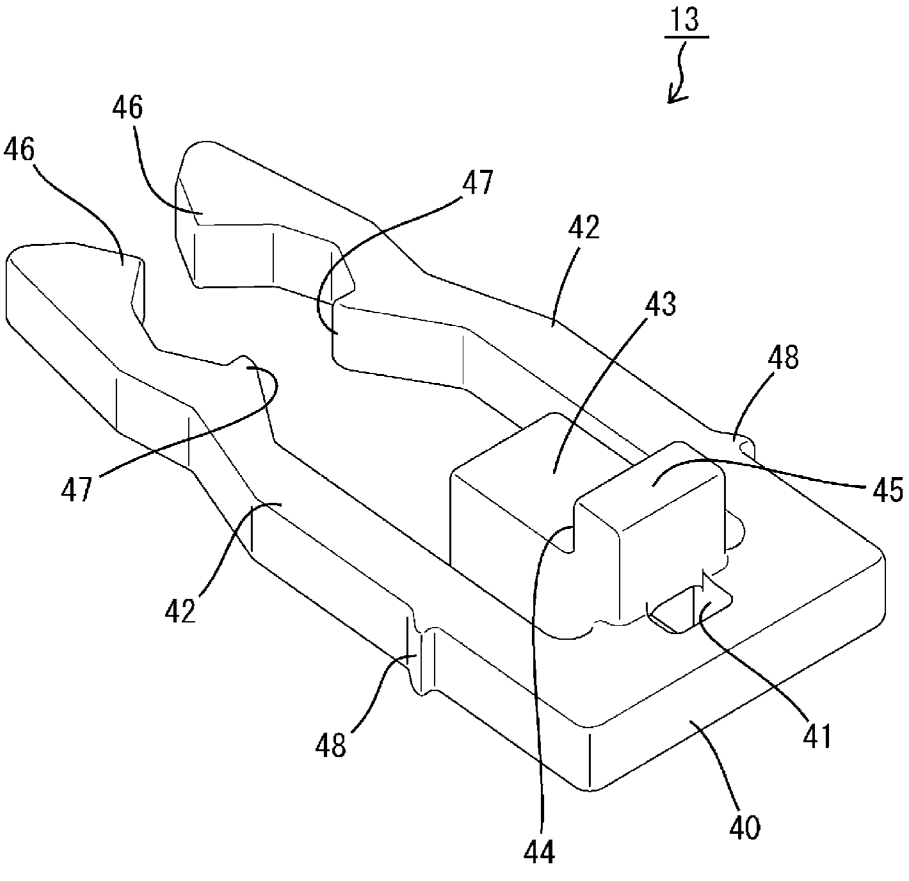
FIG. 4 is a perspective view of a detecting member according to the embodiment viewed from an upper-rear side.

The detecting member 13 is made of synthetic resin. As shown in FIGS. 2 to 4, the detecting member 13 includes a detecting member body 40, a pair of resilient portions 42 and a projecting portion 43. The detecting member body 40 is formed to extend along the width direction. The detecting member body 40 is formed with a through hole 41 vertically penetrating in a widthwise central part. The through hole 41 is used as a jig hole in returning the detecting member 13 from the detection position to the standby position.

As shown in FIGS. 3 and 4, the pair of resilient portions 42 project forward from both widthwise end parts of the detecting member body 40. The pair of resilient portions 42 are facing each other in the lateral direction. The both resilient portions 42 are deflectable and deformable in the lateral direction with connected parts to the detecting member body 40 as fulcrums. Each resilient portion 42 includes an interfering projection 46, the locking portion 47 and the locking projection 48. These interfering projections 46, locking portions 47 and locking projections 48 are paired between the both resilient portions 42 and arranged at bilaterally symmetrical positions.

As shown in FIGS. 3 and 4, the pair of interfering projections 46 are in the form of wedges projecting inward on tip parts (front end parts) of the resilient portions 42. The interfering projections 46 interfere with a later-described interfering portion 53 of the second housing 14 in a connection process of the both housings 10, 14. The interfering projections 46 interfering with the interfering portion 53 deflect and deform the resilient portions 42. In this way, the resilient portions 42 can assume each of a deflected state, a returned state attained by being displaced in a return direction from the deflected state and a transition state for transitioning from the deflected state to the returned state in the connection process of the connectors. In the deflected state, a resilient restoring force (resilient energy) by deflection displacements is accumulated in the resilient portions 42. In the transition state, the resilient portions 42 transition to the returned state while releasing the resilient restoring force. Note that the returned state of the resilient portions 42 means not only a natural state where no resilient restoring force is generated, but also a state where the accumulated restoring force partly remains without being entirely released.

As shown in FIGS. 3 and 4, the pair of locking portions 47 are respectively in the form of claws projecting inward at positions near front ends in intermediate parts in the front-rear direction of the resilient portions 42. The pair of locking portions 47 can contact the locked portion 26 in a state where the resilient portions 42 are in a natural state without being deflected and the detecting member 13 is at the standby position. In this state, the detecting member 13 is restricted from moving to the detection position. In particular, as shown in FIG. 3, the front surfaces of the locking portions 47 are inclined forward toward a widthwise inner side and to be engaged with the rear surface of the locked portion 26 inclined rearward toward widthwise outer sides. The pair of locking portions 47 are unlocked from the locked portion 26 in the deflected state of the resilient portions 42. In this state, the detecting member 13 is released from forward (to the detection position) movement restriction at the locking portions 47.

As shown in FIGS. 3 and 4, the pair of locking projections 48 are provided at positions closer to the detecting member body 40, i.e. a rear end than the locking portions 47 in the front-rear direction. The pair of locking projections 48 are respectively in the form of claws projecting laterally outward. The pair of locking projections 48 can contact the locked projections 27 with the detecting member 13 located at the standby position. In this way, the detecting member 13 is prevented from coming out rearward from the accommodation space 24.

As shown in FIGS. 2 and 3, the projecting portion 43 projects forward from the widthwise central part of the detecting member body 40 in a plan view. The projecting portion 43 is formed to project further upward than the upper surfaces of the detecting member body 40 and the pair of resilient portions 42. The projecting portion 43 is in the form of a step higher in a rear end part than in a front end in a side view. In the projecting portion 43, the front end of the rear end part constitutes the restricted portion 44 capable of contacting the restricting portion 34 of the lock arm 28, and the upper end of the rear end part constitutes the receiving portion 45 capable of contacting the receiving surface portion 35 of the lock arm 28. Side surfaces of the projecting portion 43 function as guide surfaces configured to slide in contact with inner side wall surfaces of the through portion 25.

As shown in FIG. 3, at the standby position, a forward displacement of the detecting member 13 in the accommodation space 24 is restricted by the pair of locking portions 47 locking the locked portion 26 and a rearward displacement of the detecting member 13 in the accommodation space 24 is restricted by the pair of locking projections 48 respectively locking the pair of locked projections 27.

<Second Housing 14>

The second housing 14 is made of synthetic resin and includes, as shown in FIGS. 5 to 7, a terminal accommodating portion 51, a receptacle 52 and the interfering portion 53. Further, the second housing 14 includes a mounting portion, on which a bracket for fixing the connector to a fixing object such as a vehicle body is mounted, below the receptacle 52.

As shown in FIGS. 5 to 7, the terminal accommodating portion 51 is in the form of a rectangular block. The terminal accommodating portion 51 includes a plurality of second cavities 54. The respective second cavities 54 are arranged in a row in the width direction in the terminal accommodating portion 51. As shown in FIG. 6, the terminal accommodating portion 51 includes deflectable second locking lances 55 on the lower surfaces of the respective second cavities 54. The second terminal fitting 15 is inserted into the second cavity 54 from behind and retained and locked by the second locking lance 55. The terminal accommodating portion 51 includes a second mounting hole 56 communicating with the respective second cavities 54 and open in a lower surface. The second retainer 16 is inserted into the second mounting hole 56 from below.

As shown in FIGS. 5 to 7, the receptacle 52 is in the form of a rectangular tube projecting forward from the terminal accommodating portion 51. As shown in FIGS. 5 and 6, the receptacle 52 includes a pair of guide walls 57 projecting downward in a widthwise central part. The both guide walls 57 are in the form of plates along the vertical direction and formed over the entire length of the receptacle 52 from the back surface to an opening end of the receptacle 52. The lock portion 58 projects downward between the both guide walls 57 on the front end of the receptacle 52. The lock portion 58 is in the form of a claw and the front surface thereof is arranged obliquely upward. The rear surface of the lock portion 58 is arranged obliquely upward at a steeper angle than the front surface. The lock portion 58 is locked to the lock projection 32 of the lock arm 28 when the both housings 10, 14 are connected (see FIGS. 11 and 13).

As shown in FIGS. 5 to 7, the interfering portion 53 is provided to project forward from a position above the openings of the second cavities 54 in the back surface of the receptacle 52. The interfering portion 53 interferes with the resilient portions 42 in the connection process of the connectors. Further, the interfering portion 53 protects tab portions of the second terminal fittings 15 projecting into the receptacle 52 from the openings of the second cavities 54 in the back surface of the receptacle 52 like an eave.

As shown in FIG. 7, the interfering portion 53 includes a rod-like portion 61 extending straight forward from a central part of the back surface of the receptacle 52 and having a rectangular cross-sectional shape and a widened portion 62 expanding in the width direction on the tip of this rod-like portion 61. The widened portion 62 includes detection guiding portions 63 and deflection guiding portions 64. A pair of left and right detection guiding portions 63 and a pair of left and right deflection guiding portions 64 are provided to correspond to the pair of resilient portions 42.

As shown in FIG. 7, the pair of detection guiding portions 63 are respectively inclined surfaces extending obliquely outward in the width direction from the leading ends of both left and right side surfaces of the rod-like portion 61. The detection guiding portions 63 guide the detecting member 13 to the detection position by sliding in contact with the resilient portions 42 by a resilient restoring force of the resilient portions 42 in the transition state where the resilient portions 42 transition from the deflected state to the returned state.

As shown in FIG. 7, the pair of deflection guiding portions 64 are respectively inclined surfaces extending obliquely inward in the width direction from the respective leading ends of the pair of detection guiding portions 63. The deflection guiding portions 64 guide the the resilient portions 42 to the deflected state by respectively contacting the resilient portions 42 earlier than the detection guiding portions 63 in the connection process. The pair of deflection guiding portions 64 are inclined at a steeper angle than an angle of inclination of the detection guiding portions 63 with respect to a vertical plane extending in the front-rear direction. The front end surface of the interfering portion 53 is a vertical surface extending in the lateral direction to connect the front ends of the pair of deflection guiding portions 64. Chamfering is applied to edges between the front end surface and the respective upper and lower surfaces of the interfering portion 53 (see FIGS. 5 and 6).

As shown in FIGS. 5 and 7, the second housing 14 includes a pair of through holes 65 extending from the back surface of the receptacle 52 and open in the rear surface behind the interfering portion 53. The through holes 65 are mold removal holes for forming the detection guiding portions 63 of the interfering portion 53 when the second housing 14 is molded. States of the resilient portions 42 and the interfering portion 53 at the time of connector connection can be visually confirmed from the rear surface of the second housing 14 via these through holes 65.

<Second Terminal Fittings 15, Second Retainer 16>

The second terminal fitting 15 is made of electrically conductive metal and elongated in the front-rear direction. As shown in FIG. 6, the second terminal fitting 15 is arranged in the second cavity 54 of the terminal accommodating portion 51. The second terminal fitting 15 is primarily locked in the second cavity 54 by the second locking lance 55. The second terminal fitting 15 is connected to the first terminal fitting 11 of the female connector when the connectors are properly connected. The second retainer 16 is made of synthetic resin and shaped to be long in the width direction. The second retainer 16 is inserted into the second mounting hole 56 of the terminal accommodating portion 51 to secondarily restrict the second terminal fittings 15 from coming out rearward from the second cavities 54.

<Connecting Method and Functions of Both Connectors>

First, the mounting of the detecting member 13 into the first housing 10 is described. The detecting member 13 is mounted from behind the first housing 10. In mounting the detecting member 13, the tips of the pair of resilient portions 42 on a front end side of the detecting member 13 are inserted into the accommodation space 24 from a rear end side of the first housing 10. Then, the respective interfering projections 46 on the tips of the pair of resilient portions 42 interfere with the locked portion 26 in the accommodation space 24. By further pushing the detecting member 13 with the interfering projections 46 interfering with the locked portion 26, the pair of resilient portions 42 are respectively deflected and displaced outward to widen a spacing therebetween with rear end sides serving as connecting sides to the detecting member body 40 as fulcrums, and the both interfering projections 46 ride over the locked portion 26. If the both interfering projections 46 ride over the locked portion 26, the both resilient portions 42 resiliently return and enter the returned state.

Thereafter, if the detecting member 13 is further inserted into the accommodation space 24, the both locking projections 48 on the rear end part of the detecting member 13 interfere with the both locked projections 27 in the accommodation space 24. By further pushing the detecting member 13 with the locking projections 48 interfering with the locked projections 27, the both resilient portions 42 are respectively deflected and displaced inward with the rear end sides as fulcrums, and the both locking projections 48 ride over the both locking projections 27. In this way, the detecting member 13 reaches the standby position. In this state, the detecting member 13 is in the natural state where the resilient portions 42 are neither deflected nor displaced as shown in FIG. 3.

If the detecting member 13 is at the standby position and in the natural state, the locked portion 26 is facing the both locking portions 47 from front as shown in FIG. 3. As described above, the rear surface of the locked portion 26 is inclined rearward toward the widthwise outer sides and the front surfaces of the locking portions 47 are inclined forward toward the widthwise inner side. Thus, even if an attempt is made to push the detecting member 13 to the detection position in this state, that pressing force acts in a direction to strengthen the locking of the locking portions 47 and the locked portion 26. Therefore, it is difficult to move the detecting member 13 in this state from the standby position to the detection position.

Further, if the detecting member 13 is at the standby position and in the natural state, the both locked projections 27 are facing the both locking projections 48 from behind as shown in FIG. 3. Thus, it is difficult to withdraw the detecting member 13 rearward. In this way, the detecting member 13 at the standby position and in the natural state is restricted from moving in the front-rear direction. Further, with the detecting member 13 located at the standby position, the detecting member body 40 in the rear end part of the detecting member 13 projects further rearward than the rear end of the first housing 10 (see FIGS. 2 and 3). Further, the projecting portion 43 enters the through portion 25 and projects upward as shown in FIG. 2.

Next, the connection of the both connectors is described. In connecting the both connectors, the first housing 10 is inserted into the receptacle 52 of the second housing 14. The detecting member 13 moves, accompanying the first housing 10, by the pair of locking projections 48 on the rear end part being pushed by the pair of locked projections 27. If the first housing 10 is further moved, the interfering portion 53 in the receptacle 52 enters the accommodation space 24 and interferes with the resilient portions 42. Specifically, the pair of interfering projections 46 on the front end parts of the resilient portions 42 respectively contact the pair of deflection guiding portions 64 of the interfering portion 53.

Figure 8:
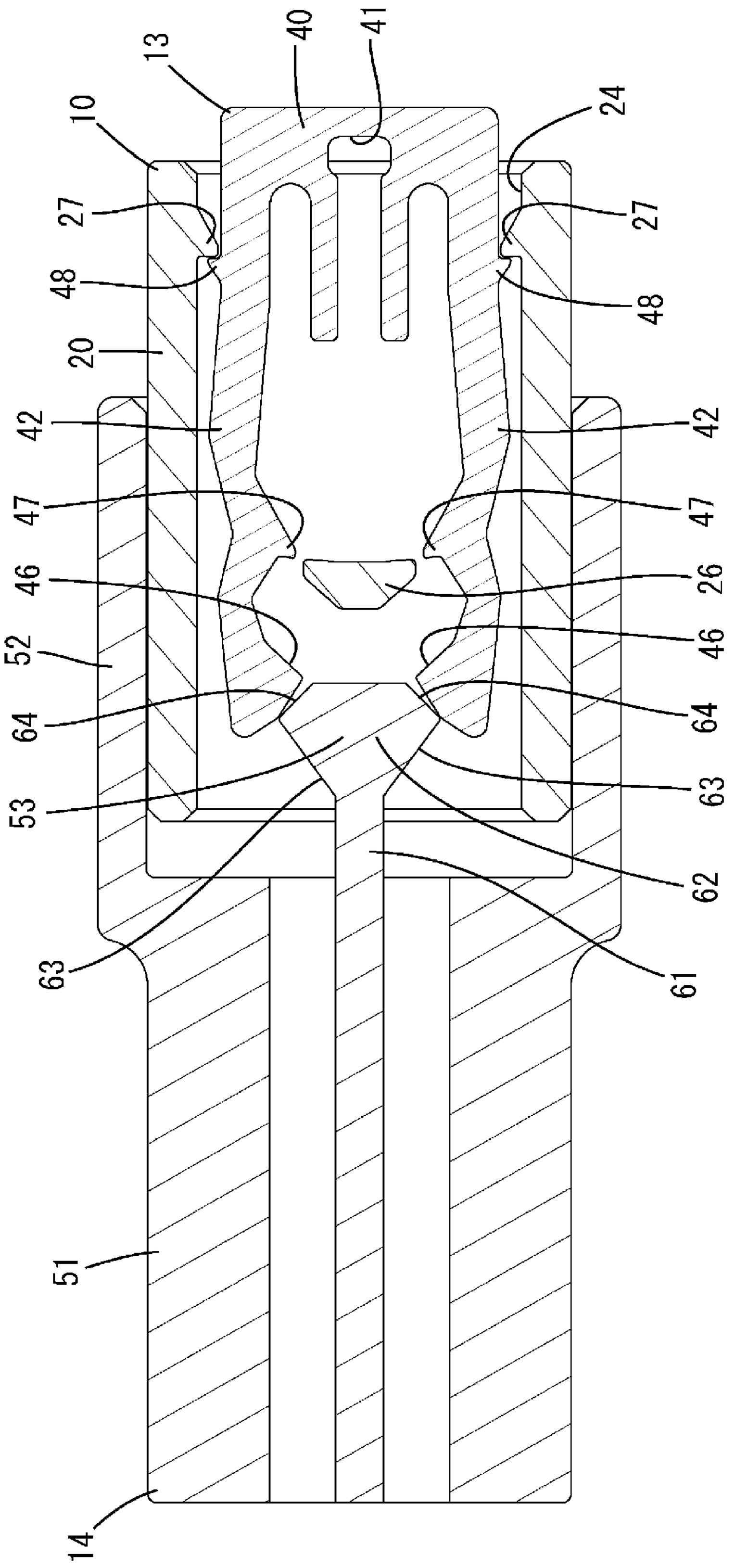
FIG. 8 is a plan view in section (No. 1) of the connector in a connection process showing a state where the locking of locking portions and a locked portion is released.

If the connection of the both connectors proceeds and the detecting member 13 is moved further forward, the both interfering projections 46 move while sliding on the surfaces of the deflection guiding portions 64. In the case of this embodiment, the pair of deflection guiding portions 64 are respectively inclined surfaces inclined outward in the width direction from front to rear. Thus, the pair of deflection guiding portions 64 move the respective contacting interfering projections 46 outward in the width direction while sliding against the respective interfering projections 46. In this way, the respective resilient portions 42 are guided to the deflected state. If the resilient portions 42 enter the deflected state, the locking projections 47 and the locked portion 26 are disengaged as shown in FIG. 8.

Figure 9:
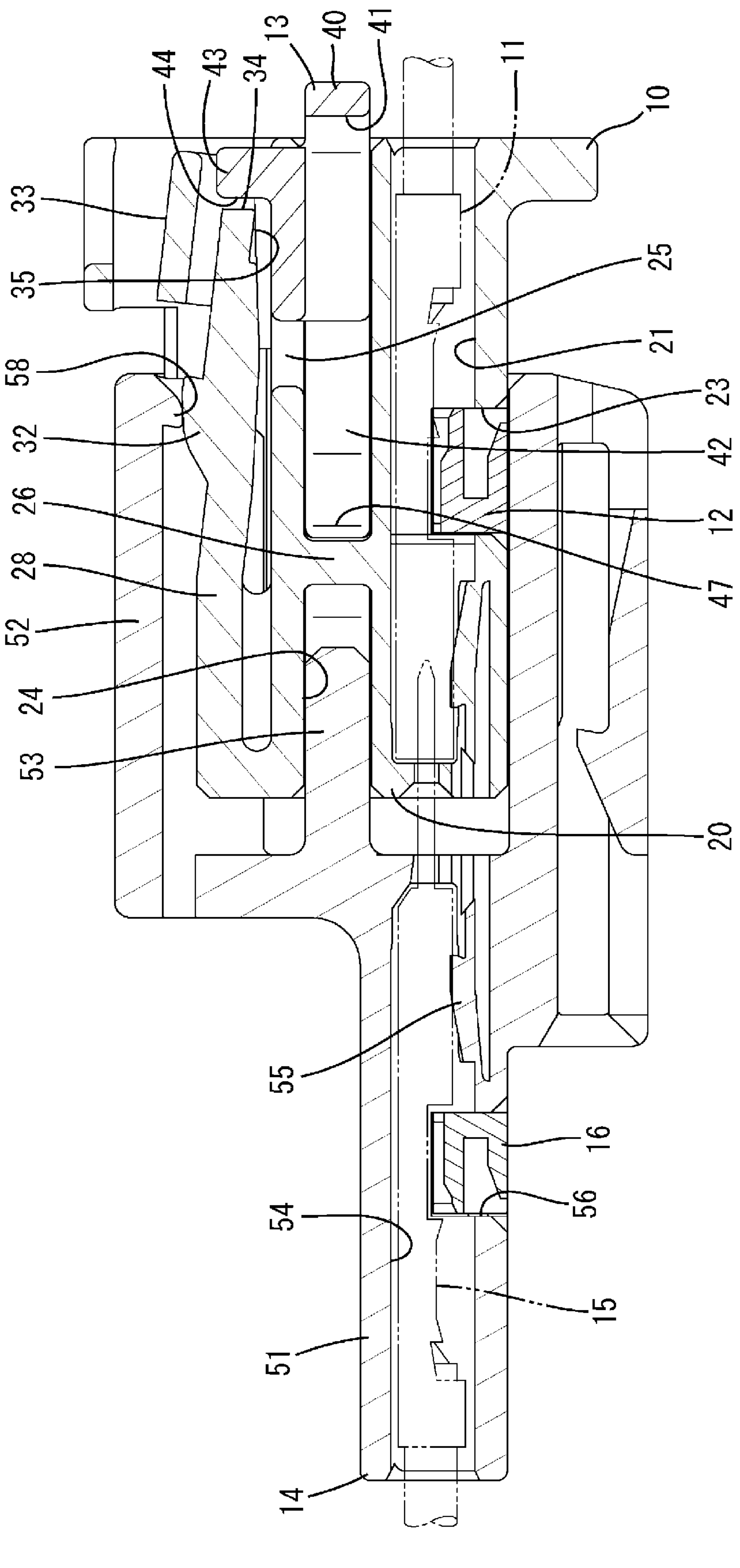
FIG. 9 is a side view in section (No. 1) of the connector in the connection process showing a state where a lock arm is resiliently displaced.

On the other hand, the lock arm 28 is resiliently displaced in the connection process of the both connectors and is resiliently displaced downward with a front end side as a fulcrum as shown in FIG. 9. In particular, the lock arm 28 moves forward according to a forward movement of the first housing 10 and interferes with the lock portion 58 provided on the receptacle 52 to be resiliently displaced downward. In this way, the restricting portion 34 on the rear end part of the lock arm 28 is located forward of the restricted portion 44 of the projecting portion 43. As just described, the detecting member 13 is restricted from moving to the detection position by the restricting portion 34 in the connection process of the both connectors. The lock arm 28 is resiliently displaced downward earlier than the aforementioned disengagement of the locking portions 47 and the locked portion 26. Thus, the detecting member 13 cannot move to the detection position until the lock arm 28 resiliently returns and the proper connection of the connectors is completed even if the locking portions 47 and the locked portion 26 are disengaged. The detecting member 13 can move to the detection position when the locking portions 47 and the locked portion 26 are disengaged, the proper connection of the connectors is completed and the lock arm 28 returns to the natural state from the deflected and deformed state.

Figure 10:
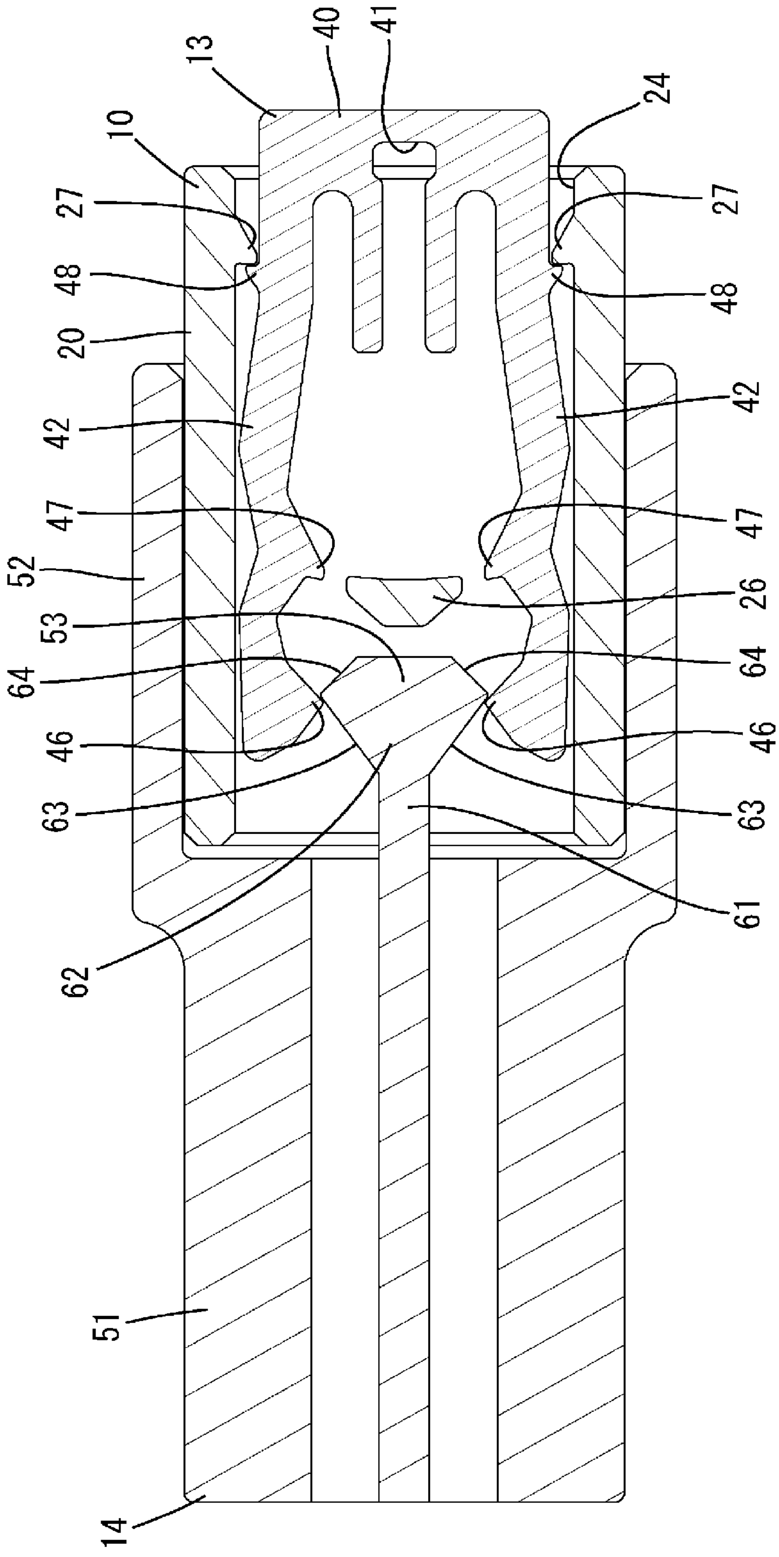
FIG. 10 is a plan view in section (No. 2) of the connector in the connection process showing a state where resilient portions are in a transition state.
Figure 11:
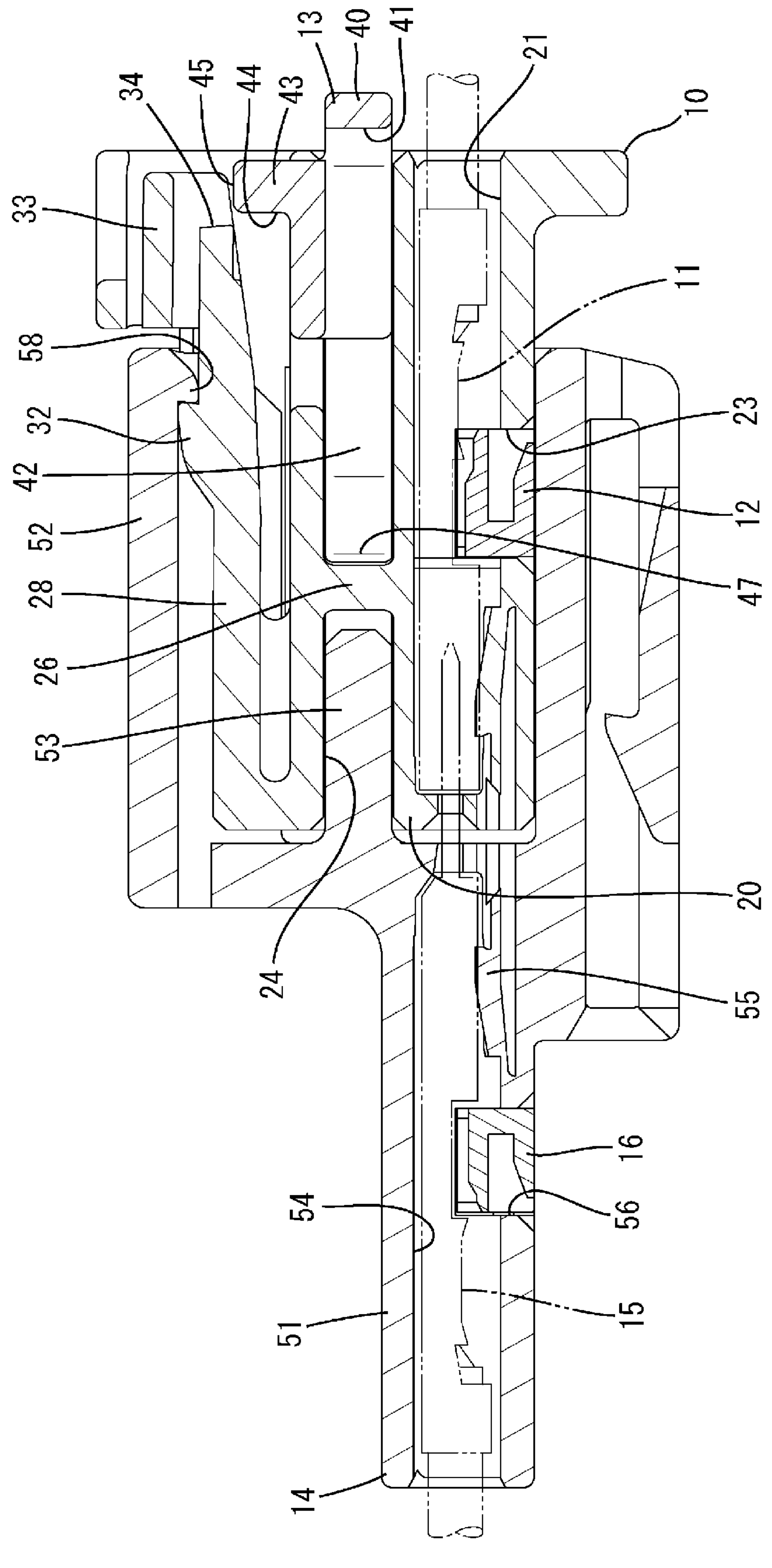
FIG. 11 is a side view in section (No. 2) of the connector in the connection process showing a state immediately after the lock arm resiliently returns.

If the connection of the both connectors further proceeds as shown in FIG. 10, the both interfering projections 46 move beyond the deflection guiding portions 64 and reach the detection guiding portions 63 provided rearward (in a moving direction to the detection position when viewed from the detecting member 13) of the deflection guiding portions 64. In this way, the resilient portions 42 enter the transition state to transition from the deflected state to the returned state. The resilient portions 42 apply a resilient restoring force accumulated in the deflected state to the detection guiding portions 63 via the interfering projections 46. If the connection of the connectors is completed in this state and, as shown in FIG. 11, the lock arm 28 is displaced in the return direction to lift movement restriction of the detecting member 13 to the detection position by the restricting portion 34, the detecting member 13 automatically moves to the detection position by the resilient restoring force of the resilient portions 42.

The detection guiding portions 63 slide in contact with the interfering projections 46 of the resilient portions 42 and guide the detecting member 13 to the detection position. In the case of this embodiment, the detection guiding portions 63 are inclined surfaces inclined inward in the width direction from front to rear in the second housing 14. The interfering projections 46 slide on the detection guiding portions 63 while applying the resilient restoring force of the resilient portions 42 to the detection guiding portions 63, and move obliquely forward toward the inner side along the surfaces of the detection guiding portions 63. In association with this, the entire detecting member 13 moves forward and reaches the detection position shown in FIGS. 12 and 13. At this time, the both resilient portions 42 slide in contact with the both detection guiding portions 63 to sandwich the interfering portion 53 from both sides. Therefore, the both resilient portions 42 transition to the returned state by respectively sliding on the respective detection positions 63 in a well-balanced manner.

Figure 13:
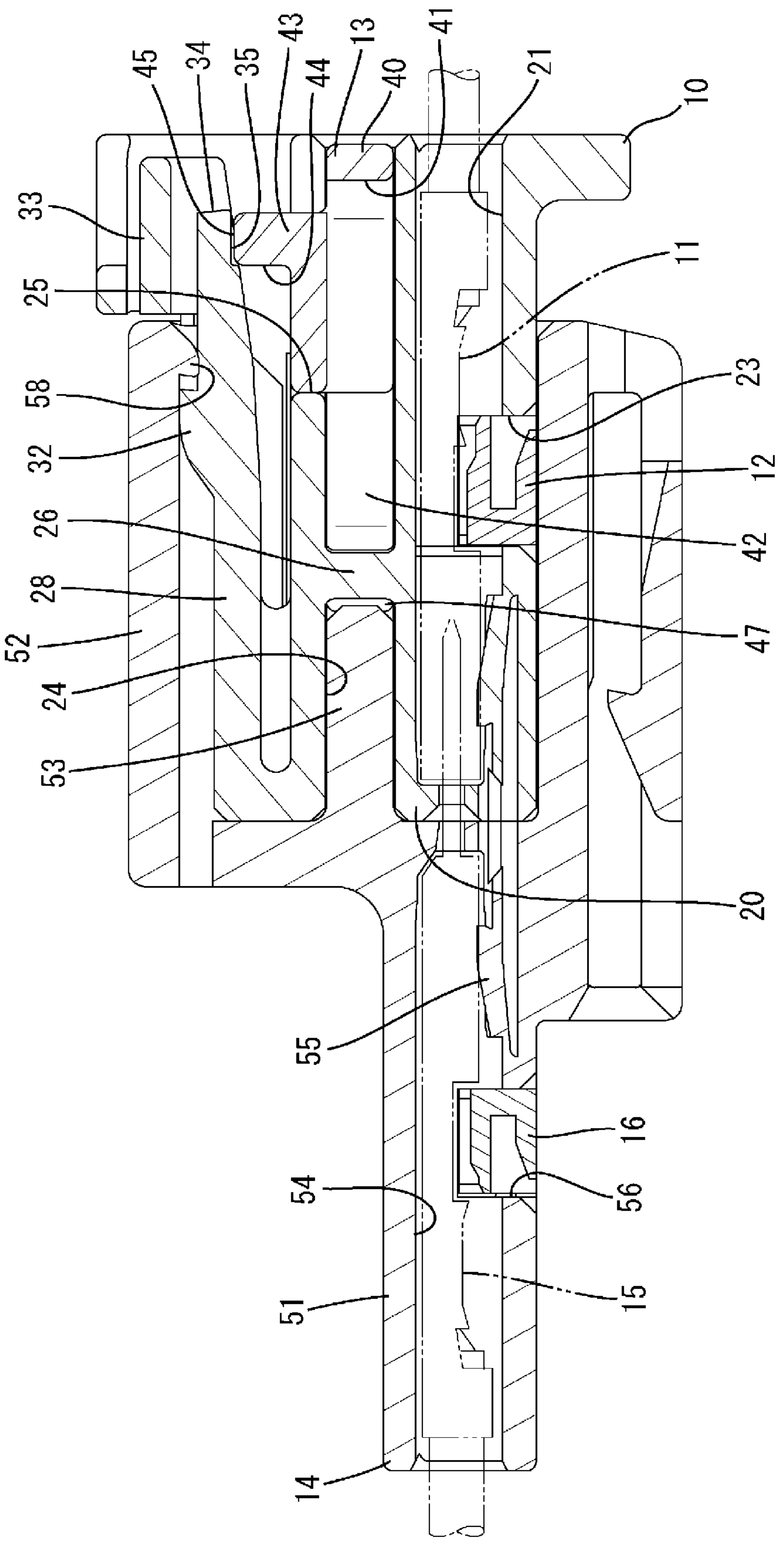
FIG. 13 is a side view in section showing the connector in the properly connected state.

As shown in FIG. 13, the receiving portion 45 of the projecting portion 43 slips under the receiving surface portion 35 of the lock arm 28 in the detecting member 13 having reached the detection position. In this way, a downward resilient displacement of the lock arm 28 is restricted and the both housings 10, 14 are maintained in a retained state. Further, in this state, the rear end of the detecting member 13 is located in front of the rear end of the accommodation space 24.

In separating the both housings 10, 14, an unillustrated jig is inserted into the through hole 41 formed in the rear part of the detecting member 13 and pulled to move the detecting member 13 rearward. In this state, the unlocking portion 33 may be pressed to deflect the lock arm 28 downward and a locked state of the lock portion 58 and the lock projection 32 may be released.

As described above, the connector of this embodiment is provided with the first and second housings 10, 14 and the detecting member 13 arranged movably to the standby position and the detection position with respect to the first housing 10 and allowed to move from the standby position to the detection position when the both housings 10, 14 are properly connected. The detecting member 13 includes the deflectable and deformable resilient portions 42 and the second housing 14 includes the interfering portion 53 for interfering with the resilient portions 42. The resilient portions 42 have the deflected state attained by interfering with the interfering portion 53 to be deflected and deformed, the returned state attained by being displaced in the return direction from the deflected state and the transition state for transitioning from the deflected state to the returned state. The interfering portion 53 is provided with the detection guiding portions 63. The detection guiding portions 63 slide in contact with the resilient portions 42 by the resilient restoring force of the resilient portions 42 and guide the detecting member 13 to the detection position in the transition state of the resilient portions 42.

In the connector of this embodiment, the detecting member 13 is guided to the detection position by the detection guiding portions 63 when the both housings 10, 14 are properly connected. The detection guiding portions 63 automatically move the detecting member 13 to the detection position without being touched by a worker's hand, using the resilient restoring force of the resilient portions 42. Thus, an operation of pushing the detecting member to the detection position after connector connection becomes unnecessary, and the operations can be simplified.

Further, since the first housing 10 accommodates the detecting member 13, it is possible to avoid the enlargement of the connector due to the detecting member as in the case of providing a detecting member outside a housing.

Further, since the resilient portions 42 are made of synthetic resin and integrally formed to the detecting member 13, the resilient portions 42 integrated with the detecting member 13 can be easily formed. Thus, the number of components can be reduced.

Further, the pair of resilient portions 42 are provided and arranged to face each other in the lateral direction orthogonal to the moving direction of the detecting member 13, and the pair of detection guiding portions 63 are provided at positions corresponding to the pair of resilient portions 42. Thus, a larger resilient restoring force can be easily generated as compared to the case where one resilient portion is provided. Further, by arranging the pair of resilient portions, the resilient restoring force by the resilient portions can act in a well-balanced manner.

Further, the detection guiding portions 63 are provided on the interfering portion 53, and the interfering portion 53 is provided with the deflection guiding portions 64 for guiding the resilient portions 42 to the deflected state by contacting the resilient portions 42 earlier than the detection guiding portions 63 in the connection process. The deflection guiding portions 64 are provided at positions behind the detection guiding portions 63 if a leading side in the moving direction of the detecting member 13 to the detection position is a front side, i.e. at positions in front of the detection guiding portions 63 in the front-rear direction of the second housing 14. The deflection guiding portions 64 are configured to guide the resilient portions 42 to the deflected state. Thus, the resilient portions 42 can be easily guided to the deflected state by the deflection guiding portions 64.

Further, the resilient portions 42 are provided in the detecting member 13, the resilient portions 42 include the locking portions 47 lockable to the locked portion 26 provided in the first housing 10 when the detecting member 13 is at the standby position, and the locking portions 47 are unlocked from the locked portion 26 when the resilient portions 42 are in the deflected state. Thus, a state where the detecting member 13 is at the standby position is suitably maintained by locking the locking portions 47 to the locked portion 26. Further, since the locking of the locking portions 47 and the locked portion 26 is released when the resilient portions 42 are in the deflected state, the locking can be automatically released in the connection process. As a result, an operation of releasing the locking of the locking portions 47 and the locked portion 26 becomes unnecessary and the complication of the operations can be avoided.

Further, the first housing 10 includes the resiliently displaceable lock arm 28 for holding the second housing 14 in the connected state, and the lock arm 28 includes the restricting portion 34 for restricting a movement of the detecting member 23 to the detection position by contacting the resiliently displaced detecting member 13. Thus, the detecting member 13 can be prevented from inadvertently moving from the standby position to the detection position in a state where the connectors are not properly connected.

Other Embodiments of Present Disclosure

The embodiment disclosed this time should be considered illustrative in all aspects, rather than restrictive.

For example, although the resilient portions are provided in the detecting member and the interfering portion is provided in the second housing in the case of the above embodiment, the resilient portions may be provided in the second housing and the interfering portion may be provided in the detecting member as another embodiment.

Although the detection guiding portions are provided on the interfering portion in the case of the above embodiment, the detection guiding portions may be provided on the resilient portions as another embodiment.

Although the first housing accommodates the detecting member in the case of the above embodiment, the detecting member may be arranged outside the first housing as another embodiment.

Although the resilient portions are made of resin in the case of the above embodiment, the resilient portions may be formed of resilient bodies made of metal or the like as another embodiment.

Although the resilient portions are integrally formed to the detecting member in the case of the above embodiment, the resilient portions may be integrally provided to the second housing as another embodiment. Note that it is not essential that the resilient portions are integrated with the detecting member or the second housing.

Although the pair of resilient portions are provided to face each other in the case of the above embodiment, one, three or more resilient portions may be provided as another embodiment. Further, if a pair of (two) resilient portions are provided, the resilient portions may be separately provided without facing each other.

Although the first housing is the housing of the female connector and the second housing is the housing of the male connector in the case of the above embodiment, the first housing may be the housing of the male connector and the second housing may be the housing of the female connector as another embodiment.

LIST OF REFERENCE NUMERALS

10 . . . first housing
11 . . . first terminal fitting
12 . . . first retainer
13 . . . detecting member
14 . . . second housing
15 . . . second terminal fitting
16 . . . second retainer
20 . . . housing body
21 . . . first cavity
22 . . . first locking lance
23 . . . first mounting hole
24 . . . accommodation space
25 . . . through portion
26 . . . locked portion
27 . . . locked projection
28 . . . lock arm
32 . . . lock projection
33 . . . unlocking portion
34 . . . restricting portion
35 . . . receiving surface portion
36 . . . protection wall
40 . . . detecting member body
41 . . . through hole
42 . . . resilient portion
43 . . . projecting portion
44 . . . restricted portion
45 . . . receiving portion
46 . . . interfering projection
47 . . . locking portion
48 . . . locking projection
51 . . . terminal accommodating portion
52 . . . receptacle
53 . . . interfering portion
54 . . . second cavity
55 . . . second locking lance
56 . . . second mounting hole
57 . . . guide wall
58 . . . lock portion
61 . . . rod-like portion
62 . . . widened portion
63 . . . detection guiding portion
64 . . . deflection guiding portion
65 . . . through hole

What is claimed is:

1. A connector, comprising:

a first housing and a second housing connectable to each other; and a detecting member arranged movably to a standby position and a detection position with respect to the first housing, the detecting member being allowed to move to the detection position when the first and second housings are properly connected, wherein:

either one of the second housing and the detecting member includes a deflectable and deformable resilient portion and the other includes an interfering portion for interfering with the resilient portion, the resilient portion has a deflected state attained by interfering with the interfering portion to be deflected and deformed, a returned state attained by being displaced in a return direction from the deflected state and a transition state for transitioning from the deflected state to the returned state, and either one of the resilient portion and the interfering portion includes a detection guiding portion for guiding the detecting member to the detection position by sliding in contact with the other by a resilient restoring force of the resilient portion in the transition state of the resilient portion.

2. The connector of claim 1, wherein the first housing accommodates the detecting member.

3. The connector of claim 1, wherein the resilient portion is made of resin and integrally formed to the detecting member or the second housing.

4. The connector of claim 1, wherein:

a pair of the resilient portions are provided and arranged to face each other in a direction orthogonal to a moving direction of the detecting member, and a pair of the detection guiding portions are provided at positions corresponding to the pair of resilient portions.

5. The connector of claim 1, wherein:

the detection guiding portion is provided on the interfering portion, and the interfering portion is provided with a deflection guiding portion for guiding the resilient portion to the deflected state by contacting the resilient portion earlier than the detection guiding portion.

6. The connector of claim 1, wherein:

the resilient portion is provided on the detecting member, the resilient portion includes a locking portion lockable to a locked portion provided in the first housing when the detecting member is at the standby position, and locking of the locking portion to the locked portion is released when the resilient portion is in the deflected state.

7. The connector of claim 6, wherein:

the first housing includes a resiliently displaceable lock arm for holding the second housing in a connected state, and the lock arm includes a restricting portion for restricting a movement of the detecting member to the detection position by contacting the detecting member in a resiliently displaced state.

* * * * *